UNITED STATES PATENT OFFICE.

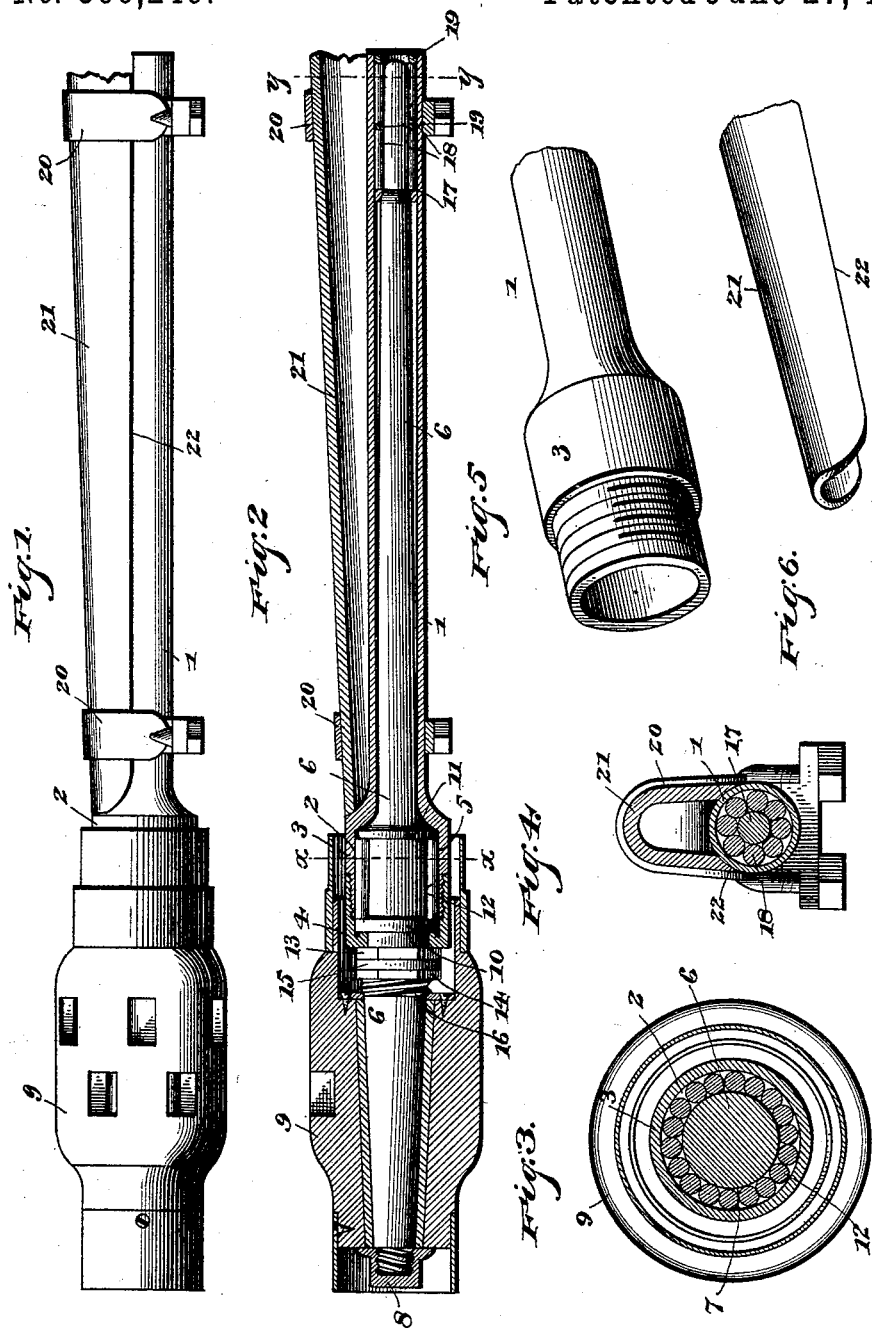

STEPHEN J. CAMPBELL, OF STEVENS POINT, WISCONSIN.

ROLLER-BEARING VEHICLE-AXLE.

SPECIFICATION forming part of Letters Patent No. 500,249, dated June 27, 1893.

Application filed January 17, 1893. Serial No. 458,716. (No model.)

*To all whom it may concern:*

Be it known that I, STEPHEN J. CAMPBELL, a citizen of the United States, residing at Stevens Point, in the county of Portage and State of Wisconsin, have invented a new and useful Roller-Bearing Vehicle-Axle, of which the following is a specification.

The invention relates to improvements in vehicle axles.

The object of the present invention is to improve the construction of vehicle axles and to provide one, which will be especially adapted for buggies and in which the bearings will be noiseless, dust proof and self lubricating.

The invention consists in the construction and novel combination and arrangement of parts hereinafter fully described, illustrated in the accompanying drawings and pointed out in the claims hereto appended.

In the drawings—Figure 1 is a side elevation of a portion of an axle constructed in accordance with this invention. Fig. 2 is a longitudinal sectional view. Fig. 3 is a transverse sectional view on line x, x of Fig. 2. Fig. 4 is a similar view on line y, y of Fig. 2. Fig. 5 is a detail perspective view of an end of the axle. Fig. 6 is a similar view of a portion of the axle bed.

Like numerals of reference indicate corresponding parts in all the figures of the drawings.

1 designates a tubular axle provided at each end with a cylindrical casing 2, which consists of an inner section 3 formed integral with the axle and exteriorly threaded, and an outer section 4 interiorly threaded and screwing on the inner section 3. The casing 2 is adapted to contain and render dust-tight an intermediate roller bearing 5 of a spindle 6, which is provided at its inner end with an inwardly extending elongated journal 7. The spindle proper 6 is threaded at its outer end to receive a nut 8 for securing a hub 9, and it is provided at its juncture with the journal 7 with annular flanges 10 and 11, between which is located an annular series of cylindrical rollers 12 forming the bearing 5. The rollers 12 fit snugly within the inner section 3 of the casing 2; and the outer casing is held against the shoulder 10, to form a dust proof covering for the bearing 5, by means of jam nuts 13 and 14 and an interposed washer 15, arranged on the threaded portion 16 of the spindle proper near the inner end of the same. The inner end of the elongated journal 7 of the spindle is reduced at 17; and this reduced portion is arranged in bearings formed by a double set of rollers 18 located within the tubular axle and separated and retained against longitudinal movement by annular flanges 19 formed by rings or in any other suitable manner. The hub has a soft metal axle box and is provided at its inner end with an enlarged cylindrical opening or recess to receive the casing 2.

The axle has secured to its upper face by clips 20 an axle bed 21, which is constructed of metal and which is approximately inverted U-shape in cross-section. The end of the axle bed adjacent to the casing conforms to the latter, and its longitudinal edges 22 are beveled to fit snugly on the tubular axle.

The bearings are lubricated by placing a suitable lubricant in the casing or in the axle between the bearings 18 and the casing; and the rotation of the spindle will serve to convey the lubricant to all parts and keep them well oiled.

It will be seen that the axle is simple and inexpensive in construction, that it is strong and durable and that the bearings are dust proof, noiseless and self-lubricating.

Changes in the form, proportion and the minor details of construction may be resorted to without departing from the principle or sacrificing any of the advantages of this invention.

What I claim is—

1. The combination of a tubular axle having bearing rollers 18 and provided at its end with a cylindrical casing composed of two sections screwing together, one of the sections being formed integral with the axle, a spindle provided with a journal-extension having its inner end reduced and arranged on the rollers 18, said spindle being provided at its juncture with the journal-extension with annular flanges and being threaded adjacent to the outer flange, rollers arranged between the flanges of the spindle and located within the casing, jam nuts arranged on the threaded portion of the spindle and securing the casing against the outer annular flange, and a hub secured on the spindle and provided with an enlarged annular recess at its inner end to receive the casing, substantially as described.

2. The combination of a tubular axle provided at its end with a cylindrical casing composed of two sections screwing together, one of the sections being formed integral with the axle, a spindle provided with a journal-extension, said spindle being provided at its juncture with the journal-extension with annular flanges and being threaded adjacent to the outer flange, rollers arranged between the flanges of the spindle and located within the casing, jam nuts arranged on the threaded portion of the spindle and securing the casing against the outer annular flange, and a hub secured on the spindle and provided with an enlarged annular recess at its inner end to receive the casing, substantially as described.

In testimony that I claim the foregoing as my own I have hereto affixed my signature in the presence of two witnesses.

STEPHEN J. CAMPBELL.

Witnesses:
W. J. DELANEY,
R. H. BUTTERFIELD.